Dec. 25, 1951    F. L. WASSELL    2,580,143
MOVABLE STRIP INDICATOR BOARD
Filed Oct. 4, 1946    2 SHEETS—SHEET 1
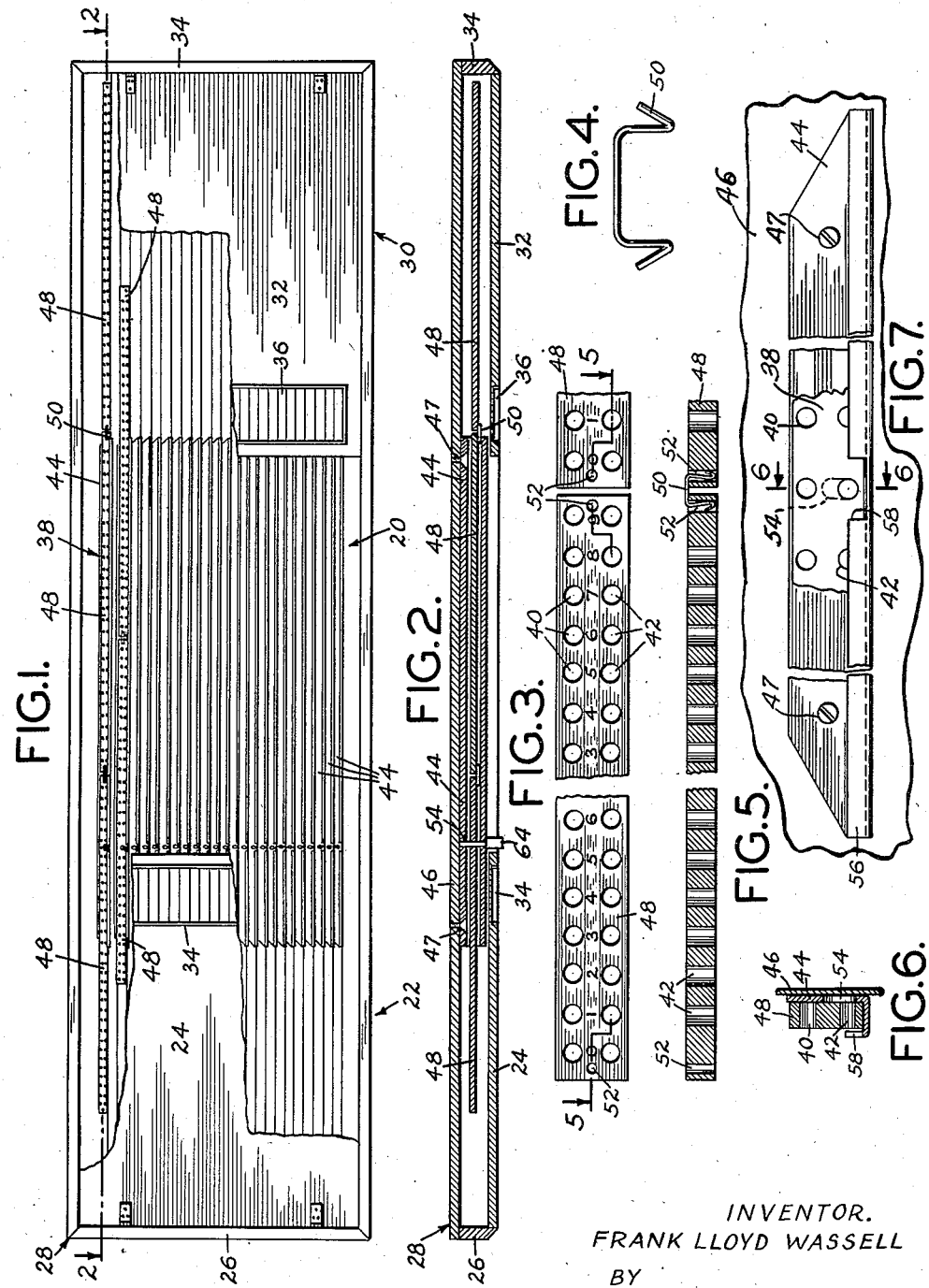
INVENTOR.
FRANK LLOYD WASSELL
BY
Campbell, Brumbaugh & Free
HIS ATTORNEYS.

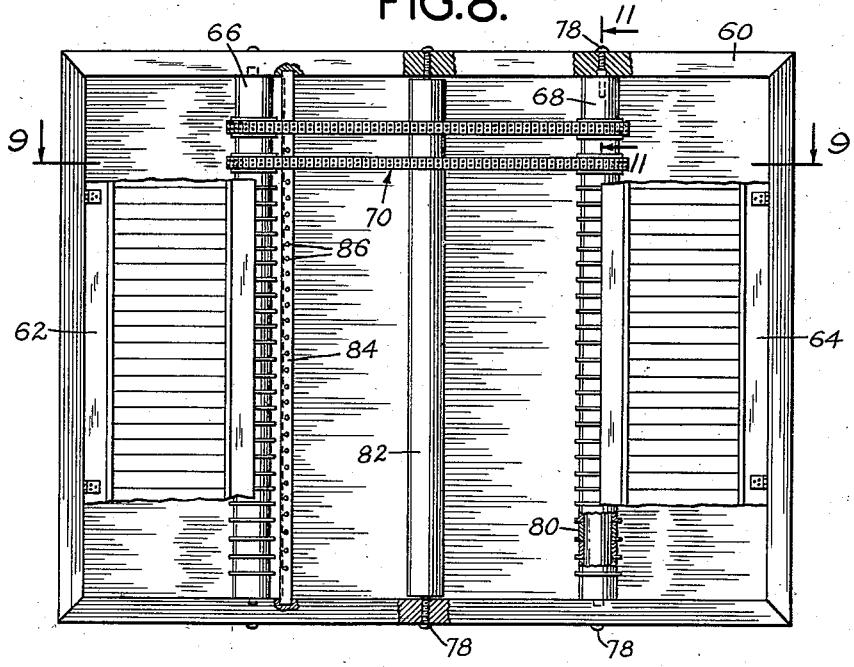
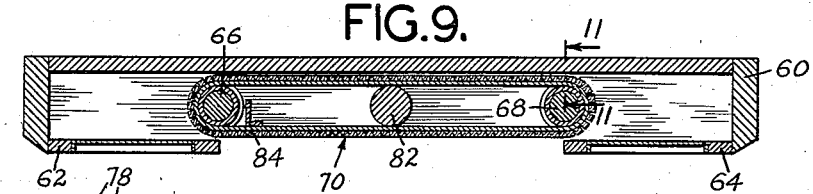
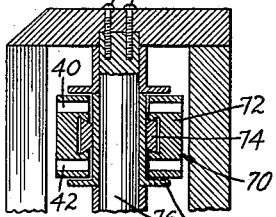
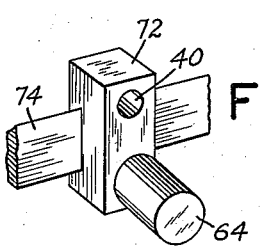
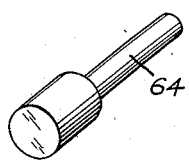
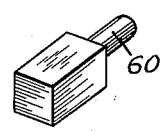

Patented Dec. 25, 1951

2,580,143

UNITED STATES PATENT OFFICE 2,580,143

MOVABLE STRIP INDICATOR BOARD

Frank Lloyd Wassell, Westport, Conn., assignor to Georgene Parkin Wassell, Westport, Conn.

Application October 4, 1946, Serial No. 701,287

8 Claims. (Cl. 116—136)

1

The present invention relates to a movable strip indicator board of the kind employing pegs or other markers for the purpose of keeping track of data of various kinds.

Industrial organizations employing fleets of vehicles, for example, such as aircraft, trucks, automobiles, taxicabs, locomotives, railway cars, ships or the like, have experienced considerable difficulty heretofore in scheduling necessary or prescribed inspections or overhaulings after a certain number of hours of flight or miles of travel as the case may be. The operators of an airline, for instance, may have determined that certain maintenance operations are desirable or necessary for every aircraft or engine after every 200, 500 and 1000 hours of flight but are not equipped with reliable and readily visible means for keeping a running check of the number of hours of flight completed by each aircraft.

It is an object of the present invention to provide a movable strip indicator board that will enable the operator of a fleet of vehicles, for example, to keep a running check on the hours or miles of service performed by each vehicle and will call to his attention the need for a particular servicing or maintenance operation on each of his vehicles at the time such operation is required.

A further object is to provide a compact board of this kind which is simple in construction and durable in operation.

A more general object of the present invention is to provide a peg positioning strip indicator board that is adaptable to a great variety of uses and which may be manipulated at will and with utmost facility.

These and other objects will become apparent from the following description of two preferred embodiments of the present invention with reference to the accompanying drawing, wherein:

Figure 1 represents a part-sectional elevation of one preferred modification of a movable strip indicator board;

Figure 2 is a vertical section through line 2—2 of the device shown in Figure 1;

Figure 3 is an elevation of a composite strip member showing parts of three elongated strip elements;

Figure 4 is a detailed view, considerably enlarged, showing a pin for connecting two of the elongated strip elements shown in Figure 3;

Figure 5 is a cross-section through line 5—5 of the elements shown in Figure 3;

Figure 6 is a cross-section of a supporting member for the elements shown in Figures 3 and 5

2 taken through line 6—6 of the device shown in Figure 7;

Figure 7 is a horizontal elevation of the supporting member shown in Figure 6;

Figure 8 is an elevation, partly in section and cut away of another preferred embodiment of a movable strip indicator control board;

Figure 9 is a vertical section through line 9—9 of the device shown in Figure 8;

Figure 10 is a detailed view in perspective showing the operative connection of a strip segment with a station peg;

Figure 11 is a part-sectional view through line 11—11 of the device shown in Figure 8;

Figure 12 is a view of an indicator peg having a square gripping portion;

Figure 13 is a view of a station peg; and

Figure 14 is a view of an indicator peg having a cylindrical gripping portion.

In describing the application of the present invention to industrial control problems, reference will be made in the following description specifically to the manner in which applicant's control board may be applied by the operators of an airline to keep them informed of the present and impending maintenance operations required for each of their aircraft. It is to be understood, however, that this specific description is merely illustrative and not intended to limit in any way the scope of applicant's invention.

Referring more particularly to the drawings, the board illustrated in Figures 1 and 2 comprises a central working section 20, a left-hand section 22, normally covered by a panel 24 hinged to the left end 26 of frame 28, and a right-hand section 30, normally covered by a panel 32, hinged at the right end 34 of frame 28. The various parts of this board may be constructed of laminated sheets of fibrous material, of plastic, or they may be formed of any other material suitable for the purposes of durability and convenience of operation. Either or both panels 24 and 32 are constructed as shown at 34 and 36 to receive various sheets of descriptive matter relating to the aircraft of which a record is to be kept or visible card indexes showing more complete records of the particular aircraft involved, the visible portion of the card or cards for a particular aircraft being opposite the line assigned to said aircraft.

The central working portion 20 of the board includes a number of slideable, composite strip member 38 having at least one, and preferably two rows of apertures 40 and 42 spaced equidistantly along the length thereof. The composite strip members 38 are arranged in parallel and mounted slideably in J-shaped supporting members 44, which in turn are fixedly mounted on the back 46 of frame 28 by any suitable means such as screws 47.

The length of frame 28 is such as to accommodate a composite strip member 38 comprising at least three elongated members 48 connected in tandem by means of connecting pins 50 engaging with holes 52. The J-shaped supporting member 44, illustrated in detail in Figures 6 and 7, is provided with a station hole 54 in the back thereof, and web 56 of J-shaped support 44 is cut away in front of hole 54, as shown at 58. Holes 40 in each elongated member 48 are adapted to receive indicator pegs 60 and 62 shown in Figures 12 and 14 respectively, and holes 42 are station holes that are in alignment with station hole 54 of J-shaped support 44 and are adapted to receive station peg 64 shown in Figure 13. The J-shaped supporting members 44 are mounted in parallel on back 46 of frame 28 in the positions shown in Figures 1 and 2 so that station holes 54 of the various supporting members form a vertical line adjacent the left-hand edge of working section 20 of the board.

In order to simplify the disclosure, only two composite strip members 38 have been shown in Figure 1. It is to be understood, of course, that each of the 25 supporting members 44 is capable of carrying, and ordinarily do carry, a composite strip member 38 and that the board may be expanded vertically to accommodate a greater number of composite strip members.

In operation, the operator initially connects together in tandem two elongated members 48 by means of connecting pin 50 for every aircraft of which a record is to be kept and places them in supporting member 44 into such position that the left-hand station hole 42 opposite numeral 0, as illustrated in Figure 3, of the left element 48 coincides with station hole 54 in supporting member 44 and inserts a station peg 64 through said holes to prevent further sliding of composite strip member 38 in J-shaped support 44. The numerals 0, 1, 2, 3, etc. on the face of each elongated element 48 may be used to designate units, tens or hundreds of hours of flight, for example, or they may be replaced by any other numerical units appropriate to the intended use. If, for instance, each aircraft is to receive an inspection, overhaul, and engine replacement at the end of each 200, 500 and 1000 hours of flight, respectively, an indicator peg 60 to indicate inspection is inserted into an aperture 40 above numeral 2, a second indicator peg 62 to indicate an overhaul is inserted into an aperture 40 above numeral 5, and a third indicator peg to indicate engine replacement is inserted into an aperture 40 above numeral 0 in the right hand element 48. Whenever the operator receives a report that the aircraft has completed ten hours of flight, for example, he removes station peg 64 from the station holes 42 and 54, inserts it into the aperture 42 below numeral 1, and moves the composite strip element 38 to the left until station peg 64 again engages with station hole 54 in support 44. Whenever indicator peg 60, for example, reaches the left side of the central working section 20, the operator is reminded that the prescribed inspection must be made on the aircraft to which the particular composite element 38 has been assigned before the aircraft can be allowed to make further flights. When the operator is informed that the inspection has been made, he need merely remove peg 60 and reinsert it into an aperture 40 above numeral 4.

As soon as the right end of the right-hand elongated member 48 reaches the vicinity of the right end of central working section 20, the operator opens panel 32 and attaches another member 48 thereto by means of connecting pin 50 inserted into holes 52. Whenever the left-hand member 48 is moved beyond the left side of the central control section 20, the operator opens panel 24 and disconnects said element by withdrawing connecting pin 50 from holes 52.

The second preferred modification of the movable strip indicator board shown in Figures 8 and 9 includes a frame 60, hinged panels 62 and 64 and rollers 66 and 68 adapted to support composite, movable strip members 70, each of which has at least one, and preferably two rows of apertures 40 and 42 spaced equidistantly along the length thereof. Each composite strip member comprises a plurality of block members 72 mounted upon an endless band 74 of steel, plastic, fiber or the like, in any suitable manner such as shown, for example, in Figures 10 and 11.

Rollers 66 and 68 each comprise a fixed shaft 76 secured to the top and bottom members of frame 60 by any suitable means such as screws 78, and a series of flanged collars 80 mounted for individual rotation on shaft 76 and adapted to support composite strip members 70. One or more auxiliary rollers 82 mounted on top and bottom members of frame 60 by screws 78 or the like, may be provided between rollers 66 and 68 to provide lateral support for composite members 70. Such rollers 82 may, if desired, be of the same construction as rollers 66 and 68.

An angle iron 84 is fixedly mounted in frame 60 in the position shown in Figures 8 and 9 and is provided with station holes 86 equal in number to the number of composite strip members 70 mounted on rollers 66 and 68, each station hole 86 being substantially in line with the row of station apertures 42 of the composite strip member 70 thereover.

Panels 62 and 64, which are hinged to side members of frame 60, are constructed to receive various sheets of descriptive matter relating to the aircraft of which a record is to be kept or visible card indexes showing more complete records of the particular aircraft involved, the visible portion of the card being opposite the composite strip element 70 assigned to the unit.

The operation of this embodiment is substantially the same as that previously described with reference to Figures 1 and 2, the only difference being that composite strip members 70 are endless, thus making it unnecessary for the operator to connect or disconnect elongated members 48. Block members 72 may also be numbered in any suitable manner. Composite strip members 70 are releasably secured against movement by means of station pegs 64 inserted through station holes 40 in block members 72 and in engagement with station holes 86 of member 84. Indicator pegs having differently shaped or marked gripping portions, such as indicator pegs 60 and 62, to indicate different operations, are inserted in suitable indicator holes 40, as before.

It will be apparent that indicating boards of the type contemplated by the present invention may be employed to control operations of varying degrees of complexity and of a large number of units. It will also be apparent that the indicator board of the present invention is susceptible to many other uses than those specifically described herein. Furthermore, it is to be understood that the terms "station peg" and "indicator peg" do not necessarily indicate that the construction or dimensions of such pegs differ from one another, but only that their respective functions are different.

Although for the purpose of illustration, only two embodiments of this invention have been disclosed, it is to be understood that many alterations in the structure may be made without departing from the scope of this invention. The invention is, therefore, to be limited only to the scope of the appended claims and the prior art.

I claim:

1. Indicating apparatus comprising a plurality of longitudinally movable strip members, said members being movable relative to and independently of one another and each member having a plurality of apertures equidistantly spaced along the length thereof, means for movably supporting said strip members, and pegs adapted to be positioned removably in said aperatures.

2. Indicating apparatus comprising a longitudinally movable strip member having two rows of apertures equidistantly spaced along the length thereof, means for supporting said strip member for longitudinal movement, a fixed member adjacent said movable strip member having a station hole substantially in line with one of said rows of apertures in said movable strip member, a station peg adapted to be positioned removably in the apertures of said one of said rows of apertures and in the station hole in said fixed member to secure said strip member against movement, and at least one indicator peg adapted to be positioned removably in the apertures of the other of said rows of apertures in said movable strip member.

3. Indicating apparatus comprising a plurality of composite, longitudinally movable strip members, said members being movable relative to and independently of one another and each member having a plurality of apertures equidistantly spaced along the length thereof, means for detachably connecting components of said strip members in tandem, means for supporting said composite strip members, and pegs adapted to be positioned removably in said apertures.

4. Indicating apparatus comprising a composite, longitudinally movable strip member having a plurality of apertures equidistantly spaced along the length thereof and comprising a plurality of elongated members detachably connected in tandem, fixed means for slidably supporting said composite strip member, said means having a station hole substantially in line with said apertures, a station peg adapted to be positioned removably in said apertures and said station hole to fix said movable strip member to said supporting means, and at least one indicator peg adapted to be positioned removably in said apertures.

5. Indicating apparatus comprising a plurality of composite, longitudinally slidable strip members disposed parallel to one another, each of said composite strip members having a plurality of apertures equidistantly spaced along the length thereof and comprising a plurality of elongated members detachably connected in tandem, means for slidably supporting said composite strip members, said means having station holes substantially in line with the apertures in the composite strip members, station pegs adapted to be positioned removably in said apertures and said station holes individually to fix said movable strip members to said supporting means, and indicator pegs adapted to be positioned removably in said apertures.

6. Indicating apparatus comprising a composite, longitudinally movable strip member having two rows of apertures equidistantly spaced along the length thereof and comprising a plurality of elongated members detachably connected in tandem, means for slideably supporting said composite strip member, said means having a station hole substantially in line with one of said rows of apertures in said composite strip member, a station peg adapted to be positioned removably in the apertures of said one of said rows of apertures and in the station hole in said supporting means to fix said composite strip member to said supporting means, and at least one indicator peg adapted to be positioned removably in the apertures of the other of said rows of apertures in said composite strip member.

7. Indicating apparatus comprising a plurality of longitudinally movable strip members, said members being movable relative to and independently of one another, each strip member having a plurality of apertures equidistantly spaced along the length thereof and comprising a plurality of block members mounted upon an endless band, a pair of rollers to support said composite strip member for longitudinal movement thereof, a fixed member adjacent said composite strip member and having a station hole substantially in line with said apertures, a station peg adapted to be positioned removably in said apertures and said station hole to fix said composite strip member to said fixed member, and at least one indicator peg adapted to be positioned removably in said apertures.

8. Indicating apparatus comprising a composite, longitudinally movable strip member having two rows of apertures equidistantly spaced along the length thereof and comprising a plurality of block members mounted upon an endless band, a pair of rollers to support said composite strip member for longitudinal movement thereof, a fixed member adjacent said composite strip member and having a station hole substantially in line with one of said rows of apertures in said composite strip member, a station peg adapted to be positioned removably in the apertures of said one of said rows of apertures and in the station hole in said fixed member to engage said movable strip member with said fixed member, and at least one indicator peg adapted to be positioned removably in the apertures of the other of said rows of apertures in said movable strip member.

FRANK LLOYD WASSELL.

REFERENCES CITED

The following references are of record in the file of this patent:

UNITED STATES PATENTS

| Number | Name | Date |
|---|---|---|
| 262,903 | McMurtry et al. | Aug. 15, 1882 |
| 277,681 | Cole | May 15, 1883 |
| 488,937 | Dougan | Dec. 27, 1892 |
| 891,949 | Newell | June 3, 1908 |
| 1,452,074 | Evans | Apr. 17, 1923 |
| 1,513,667 | Matthewman | Oct. 28, 1924 |
| 1,602,833 | Perry | Oct. 12, 1926 |
| 1,776,842 | Reinicke | Sept. 30, 1930 |
| 1,794,007 | Fisher | Feb. 24, 1931 |
| 1,818,951 | Hanell et al. | Aug. 11, 1931 |